US010518184B2

(12) United States Patent
Xiong et al.

(10) Patent No.: US 10,518,184 B2
(45) Date of Patent: Dec. 31, 2019

(54) ASSEMBLY AND ROBOT HAVING THE SAME

(71) Applicant: UBTECH Robotics Corp, Shenzhen (CN)

(72) Inventors: Youjun Xiong, Shenzhen (CN); Xinpu Chen, Shenzhen (CN); Lefeng Liu, Shenzhen (CN); Tanfu Xiao, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/059,041

(22) Filed: Aug. 9, 2018

(65) Prior Publication Data

US 2019/0168126 A1 Jun. 6, 2019

(30) Foreign Application Priority Data

Dec. 4, 2017 (CN) .......................... 2017 1 1261388

(51) Int. Cl.
| | |
|---|---|
| *A63H 3/46* | (2006.01) |
| *A63H 13/00* | (2006.01) |
| *A63H 11/00* | (2006.01) |
| *B25J 19/00* | (2006.01) |
| *B25J 11/00* | (2006.01) |

(52) U.S. Cl.
CPC .............. *A63H 3/46* (2013.01); *A63H 11/00* (2013.01); *A63H 13/00* (2013.01); *B25J 19/0075* (2013.01); *B25J 11/003* (2013.01); *B25J 19/0016* (2013.01); *F16F 2238/024* (2013.01)

(58) Field of Classification Search
CPC .......... A63H 3/46; A63H 13/04; A63H 13/00; B25J 11/003; F16F 2238/024
See application file for complete search history.

(56) References Cited

U.S. PATENT DOCUMENTS

| | | | | |
|---|---|---|---|---|
| 4,261,113 A * | 4/1981 | Alderson | ................ | G09B 23/32 434/274 |
| 6,672,553 B1 * | 1/2004 | Lin | ........................ | F16M 11/08 248/276.1 |
| 7,637,463 B2 * | 12/2009 | Yen | ..................... | F16M 11/2014 248/123.11 |
| 7,891,631 B2 * | 2/2011 | Lee | ........................ | F16M 11/10 248/123.11 |
| 8,011,632 B2 * | 9/2011 | Wang | ..................... | F16M 11/10 248/284.1 |
| 9,155,235 B2 * | 10/2015 | Lindblad | ................... | F16F 3/04 |
| 9,371,955 B2 * | 6/2016 | Fu | ........................... | F16M 11/10 |
| 10,118,290 B2 * | 11/2018 | Nagatsuka | ................. | B25J 5/00 |
| 2005/0152102 A1 * | 7/2005 | Shin | ....................... | F16M 11/10 361/679.29 |

(Continued)

*Primary Examiner* — Melba Bumgarner
*Assistant Examiner* — Amir A Klayman

(57) ABSTRACT

An assembly for a robot includes a shoulder, an arm rotatably connected to the shoulder, an armor decorative member connected to the arm and located adjacent to the shoulder, and a connection assembly located between and rotatably connected to the arm and the armor decorative member. Relative rotation between the arm and the connection assembly and between the armor decorative member and the connection assembly enables the arm to continue to rotate after an upper end of the armor decorative member comes into contact with the shoulder.

7 Claims, 7 Drawing Sheets

(56) References Cited

U.S. PATENT DOCUMENTS

| | | | |
|---|---|---|---|
| 2006/0032998 A1* | 2/2006 | Depay | F16M 11/10 248/291.1 |
| 2007/0128974 A1* | 6/2007 | Yasui | A63H 3/08 446/387 |
| 2007/0167108 A1* | 7/2007 | Hanamoto | A63H 3/04 446/321 |
| 2014/0090508 A1* | 4/2014 | Hirano | B25J 9/0051 74/490.05 |
| 2014/0190280 A1* | 7/2014 | Been | G09B 23/32 73/866.4 |
| 2018/0113153 A1* | 4/2018 | Jang | G01N 27/00 |
| 2018/0147108 A1* | 5/2018 | Lee | A61H 1/0244 |
| 2018/0290311 A1* | 10/2018 | Chandra | B25J 15/0466 |
| 2019/0083350 A1* | 3/2019 | Weidner | A61F 5/026 |

* cited by examiner

ASSEMBLY AND ROBOT HAVING THE SAME

CROSS REFERENCE TO RELATED APPLICATIONS

This application claims priority to Chinese Patent Application No. 201711261388.0, filed Dec. 4, 2017, which is hereby incorporated by reference herein as if set forth in its entirety.

BACKGROUND

1. Technical Field

The present disclosure generally relates to robots, and particularly to an assembly that allows an arm of the robot to continue its rotation after a pauldron of the robot comes into contact with the shoulder of the robot.

2. Description of Related Art

Robots such as toy robots in the shape of animals, cartoon characters and movie characters are known. For a robot that is shaped to resemble a Star Wars Stormtrooper, accessories such as armor decorative members are usually provided and can be coupled to the arms of the robot. One problem with such configuration is that when an arm of the robot is lifted, the upper end of the armor decorative member will come into contact with the shoulder of the robot, which prevents further movement of the arm and thus adversely affects the normal operation of the robot.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
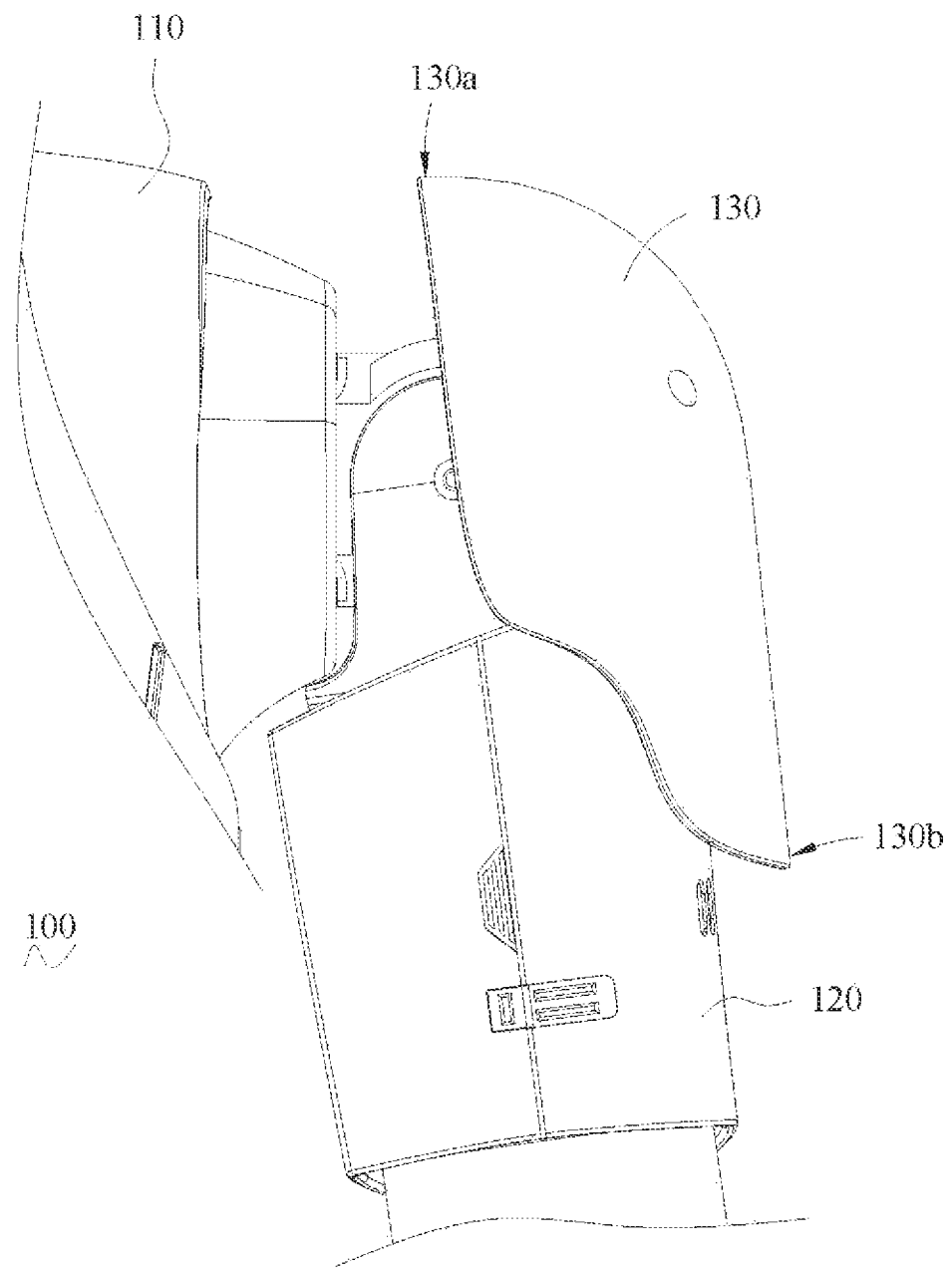
FIG. 1 is a schematic partial planar view showing an assembly for a robot according to an embodiment, in which an arm is in a vertical orientation.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

An assembly according to an embodiment of the present disclosure is applied in a robot that is shaped to resemble a Star Wars Stormtrooper.

Referring to FIG. 1, in one embodiment, an assembly 100 includes a shoulder 110, an arm 120 rotatably connected to the shoulder 110 and an armor decorative member 130 connected to the arm 120 and located adjacent to the shoulder 110. The armor decorative member 130 is used to cover the joint between the shoulder 110 and the arm 120. The armor decorative member 130 serves as a pauldron. In the embodiment, the shoulder 110, the arm 120 and the armor decorative member 130 are made of plastic material. In an alternative embodiment, one or more of the three components may be made of other suitable material, such as metal. The arm 120 is rotatable around an imaginary axis with respect to the shoulder 110, between a vertical orientation (see FIG. 1) and a horizontal orientation (see FIG. 7) where the armor decorative member contacts the shoulder 110.

Figure 2:
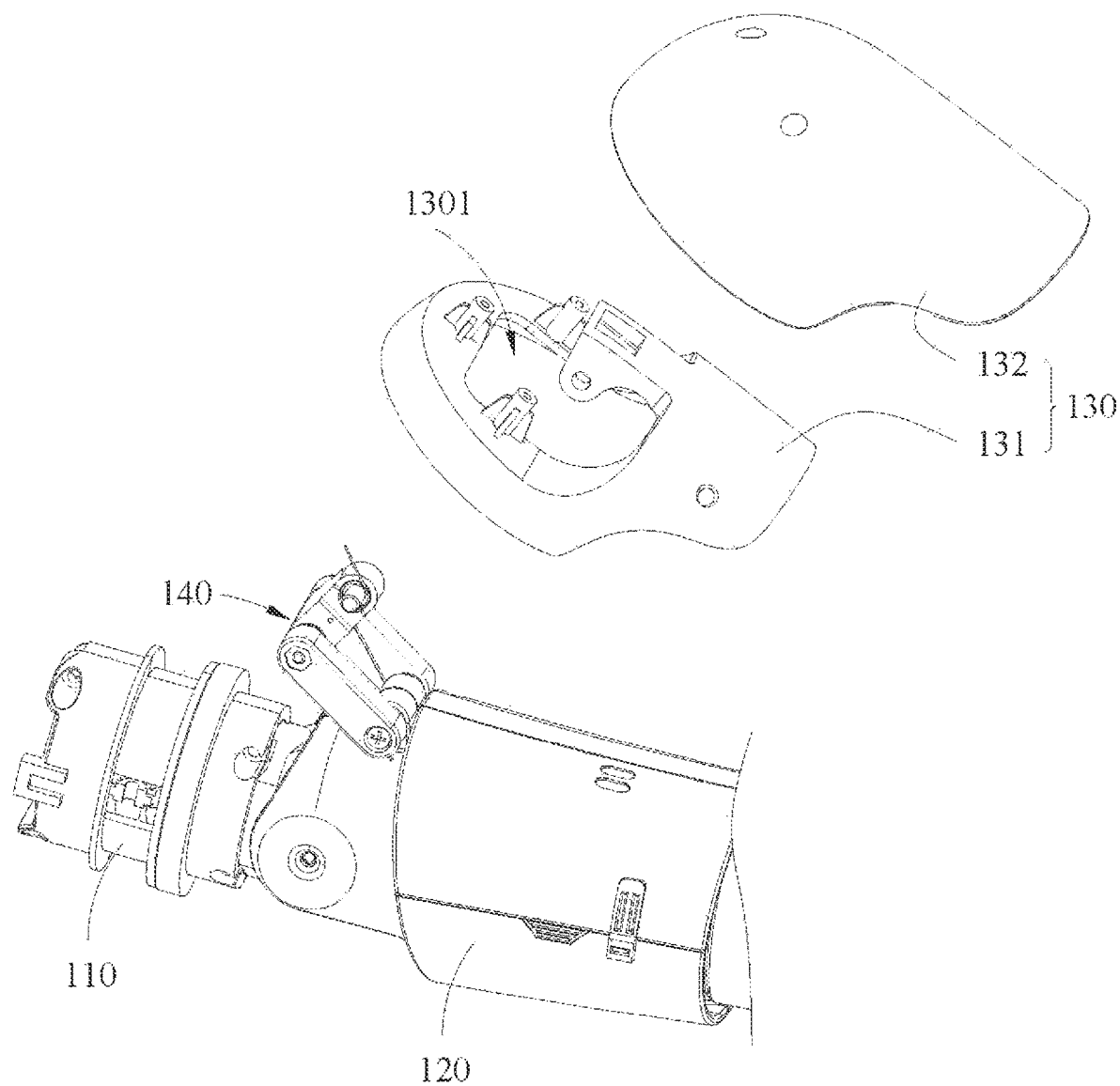
FIG. 2 is a schematic exploded view of the assembly of FIG. 1.
Figure 3:
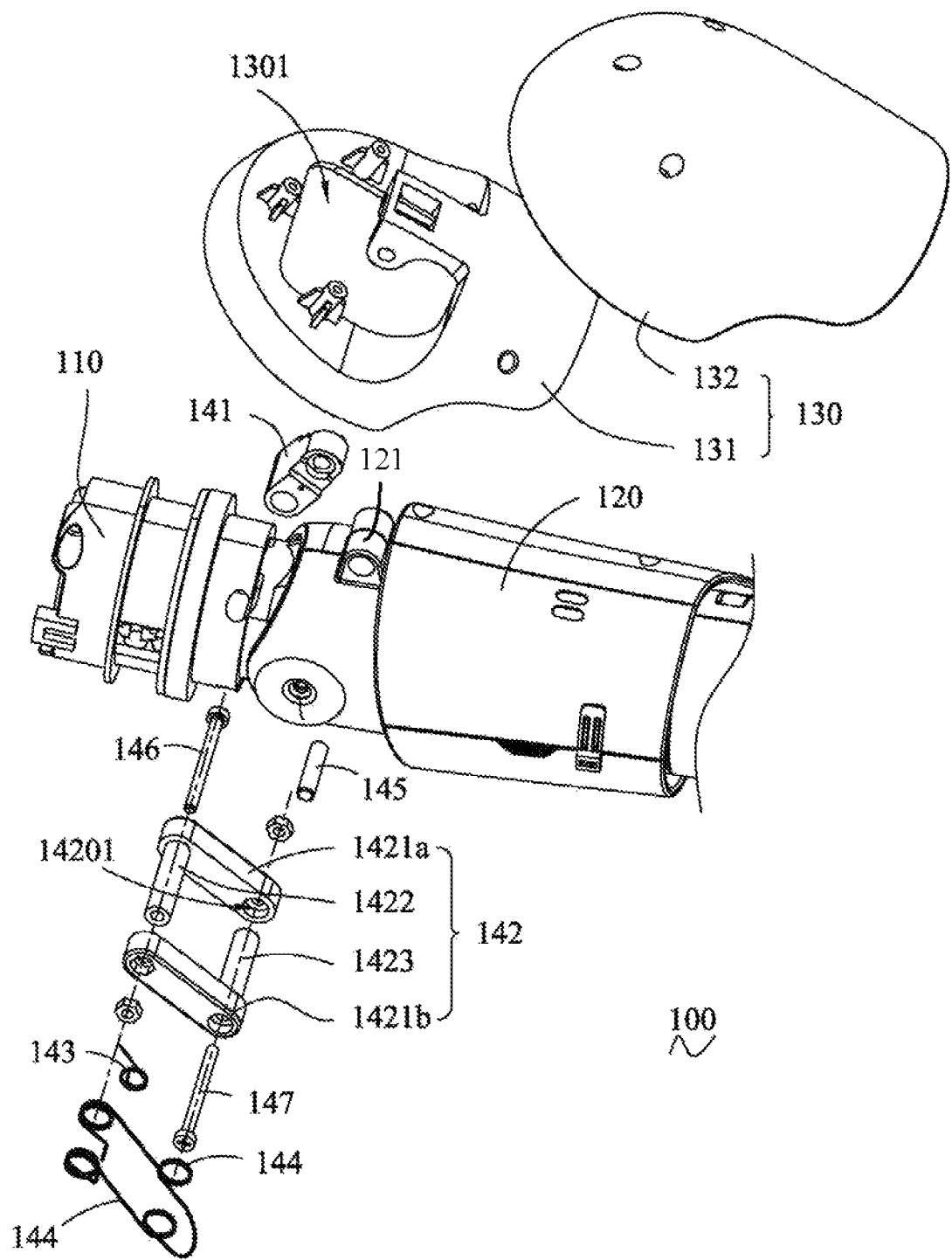
FIG. 3 is a schematic exploded view of the assembly of FIG. 1, in which the connection assembly of FIG. 2 is further shown in an exploded manner.
Figure 4:
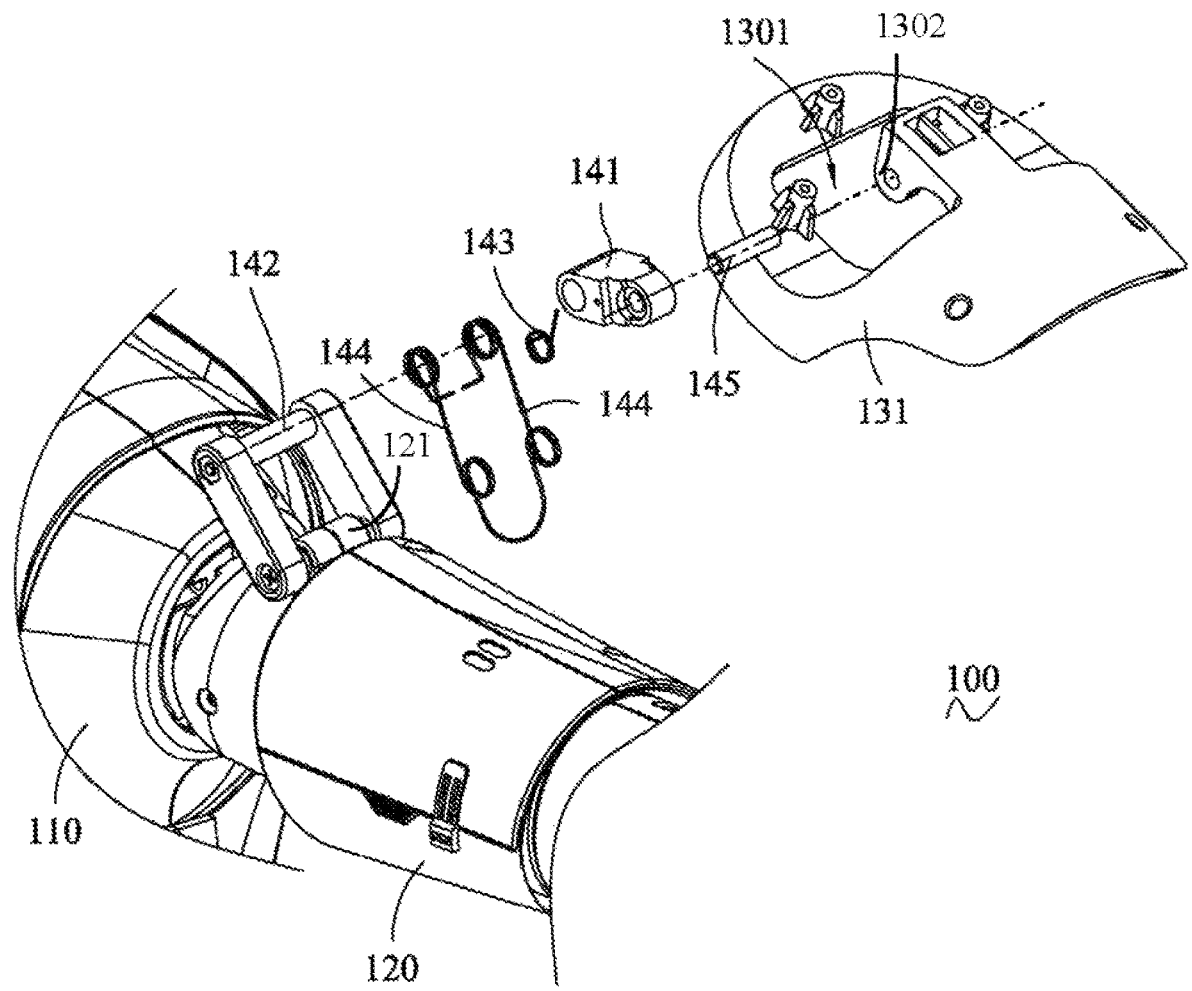
FIG. 4 is similar to FIG. 3, but viewed from a different perspective.

Referring to FIGS. 2-4, in one embodiment, the assembly further includes a connection assembly 140 located between and rotatably connected to the arm 120 and the armor decorative member 130. Relative rotation between the arm 120 and the connection assembly 140 and between the armor decorative member 130 and the connection assembly 140 enables the arm 120 to continue to rotate after an upper end of the armor decorative member 130 comes into contact with the shoulder 110.

In one embodiment, the connection assembly 140 includes a first connection member 141, a second connection member 142, a first torsion spring 143 and a second torsion spring 144. The first connection member comprises a first, upper end (see FIG. 2) rotatably connected to the armor decorative member 130 and a second, lower end. The second connection member 142 includes a first bar 1422 and a second bar 1423. The second end of the first connection member 141 is rotatably connected to the first bar 1422. The first torsion spring 143 is connected to the first connection member 141 and used to apply a restoring force to the armor decorative member 130. The second torsion spring 144 is connected to the first bar 1422 and the second bar 1423.

The assembly 100 further includes a connection shaft 145. The first end of the first connection member 141 defines a first connection hole, and the armor decorative member 130 defines a mounting hole 1302 (see FIG. 4). One end of the connection shaft 145 is fixed in one of the first connection hole and the mounting hole 1302, and an opposite end of the connection shaft 145 is rotatable in the other one of the first connection hole and the mounting hole 1302, thereby rotatably connecting the armor decorative member 130 to the first connection member.

In one embodiment, the second connection member 142 further includes a first connection support 1421a and a second connection support 14216b. Opposite ends of the first bar 1422 are fixed to the first connection support 1421a and the second connection support 1421b at first ends thereof, and opposite ends of the second bar 1423 are fixed to the first connection support 1421a and the second connection support 1421b at second ends thereof. In the embodiment, the first connection support 1421a defines a fixing hole 14201 in a first end thereof, and the second connection support 1421b defines a fixing hole 14201 in a second end thereof.

In one embodiment, the second connection member 142 further includes a first pin 146 and a second pin 147. The first bar 1422 and the second bar 1423 are hollow. The first pin 146 passes through, in sequence, the first end of the first connection support 1421a, the first bar 1422 and the first end of the second connection support 1421b so as to fix the first bar 1422 to the first connection support 1421a and the second connection support 1421b. The second pin 147 passes through, in sequence, the second end of the first connection support 1421a, the second bar 1423 and the second end of the second connection support 1421b so as to fix the second bar 1423 to the first connection support 1421a and the second connection support 1421b. Specifically, the first connection support 1421a defines a mounting hole in a second end thereof, and the second connection support 1421b defines a mounting hole in a first end thereof. The mounting holes of the first connection support and the second connection support respectively allow the first pin 146 and the second pin 147 to pass therethrough. The first pin 146 and the second pin 147 can then respectively pass through the first bar 1422 and the second bar 1423. After that, ends of the first pin 146 and the second pin 147 are respectively received in the fixing holes of the second connection support 1421b and the first connection support 1421a. In the embodiment, the ends of the first pin 146 and the second pin 147 each include a threaded portion that is engaged with a nut to lock the first bar 1422 and the second bar 1423 to the first connection support 1421a and the second connection support 1421b. In the embodiment, the second bar 1423 passes through a bar receiver 121 on the arm 120, which rotatably connects the second connection member 142 to the arm 120.

With such configuration, when the armor decorative member 130 contacts the shoulder 110, the connection assembly 140 enables the armor decorative member 130 to further move together with arm 120. An angle formed between a first imaginary plane that passes through the axes of the connection shaft 145 and the first pin 146 and a second imaginary plane that passes through the axes of the first pin 146 and the second pin 147 is not equal to 180 degrees when the arm 120 is in the vertical orientation, thereby allowing the armor decorative member 130 to move with respect to the arm 120.

Referring to FIGS. 2 and 4, the connection shaft 145, the first pin 146 and the second pin 147 are parallel to the imaginary axis around which the arm 120 rotates. An angle between a first imaginary plane that passes through the axes of the connection shaft 145 and the first pin 146 and a second imaginary plane that passes through the first pin 146 and the second pin 147 is not equal to 180 degrees, which enables a relative movement of the armor decorative member 130 with respect to the arm 120. The armor decorative member 130 includes an upper end 130a and a lower end 130b. As shown in FIG. 1, the upper end 130a is spaced apart from the shoulder 110 when the arm 120 is in the vertical orientation. The upper end 130a will come into contact with the shoulder 110 after the arm 120 has rotated for a predetermined angle from the vertical orientation. Before the end contacts the shoulder 110, the arm 120 and the armor decorative member 130 will rotate as a whole. After the end contacts the shoulder 110, further rotation of the arm 120 will cause the second connection member 142 to rotate toward the first connection member 141.

Specifically, the shoulder 110, the arm 120, the armor decorative member 130, the first connection member 141 and the second connection member 142 constitute a five-bar linkage mechanism. When the arm 120 is in the vertical orientation as shown in FIG. 1, the upper end 130a of the armor decorative member 130 faces the shoulder 110 and is spaced apart from the shoulder 110. The armor decorative member 130 is connected to the arm 120 via the connection assembly 140 and is held in a normal orientation as shown in FIG. 1. When the arm 120 starts to rotate from the vertical orientation, the arm 120, the armor decorative member 130 and the connection assembly 140 will rotate as a whole. After the arm 120 has rotated for a predetermined angle, the upper end 130a comes into contact with the shoulder 110. After that, further rotation of the arm 120 will rotate the second connection member 142 which then drives the first connection member 141 to rotate with respect to the second connection member 142 and the armor decorative member 130. In other words, the connection assembly 140 changes from a relatively folded state to an unfolded state after the arm 120 has rotated from the vertical orientation to the horizontal orientation, which causes the end of the armor decorative member 130 away from the shoulder 100 to move upward while the end of the armor decorative member 130 adjacent to the shoulder 100 stays in contact with the shoulder 110. During the rotation of the first connection member 141 and the second connection member 142, the first torsion spring 143 and the second torsion spring 144 are twisted and store mechanical energy. When the arm 120 rotates back to a position where the upper end 130a comes out of contact with the shoulder 110, the first torsion spring 143 and the second torsion spring 144 return the first connection member 141, the second connection member 142 and the armor decorative member 130 to their initial orientation with respect to the arm 120.

In the embodiment, when the arm 120 is in the vertical orientation, the angle formed between the first imaginary plane and the second imaginary plane is greater than 20 degrees and less than 45 degrees, so as to allow the arm 120 to have more space to move with respect to the armor decorative member 130.

Figure 5:
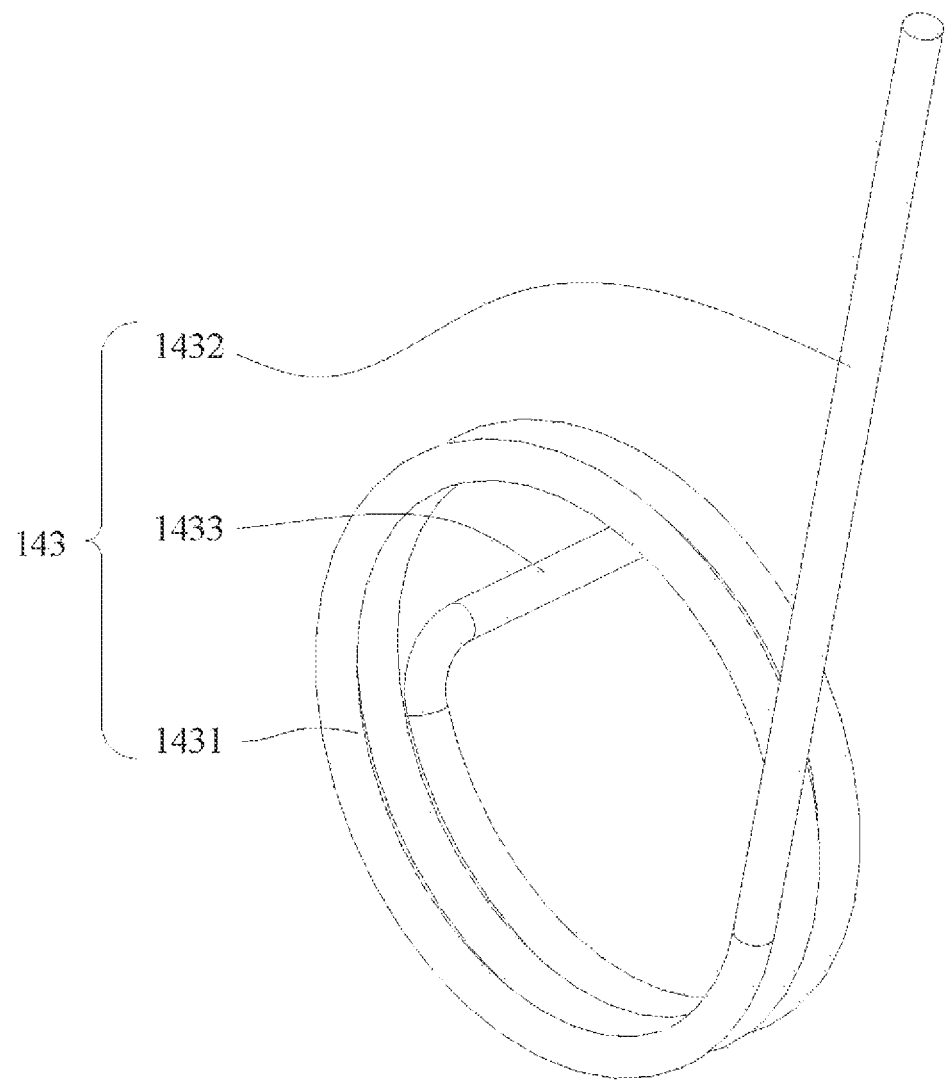
FIG. 5 is an isometric view of a torsion spring of the assembly of FIG. 3.

Referring to FIG. 5, in the embodiment, the first torsion spring 143 includes a helical coiled portion 1431 arranged around the connection shaft 145, a first arm 1432 extending from one end of the coiled portion 1431 and abutting against the armor decorative member 130, and a second arm 1433 extending from the opposite end of the coiled portion 1431 and abutting against the first connection member 141. In the embodiment, since the coiled portion 1431 arranged around the connection shaft 145 and the second arm 1433 is connected to the first connection member 141, the first torsion spring 143 is thus held in position and cannot move/rotate with respect to the connection shaft 145. The first arm 1432 is thus free from the need of being connected to the armor decorative member 130, which facilitates the simplifying of the mounting process of the first torsion spring 143.

Figure 6:
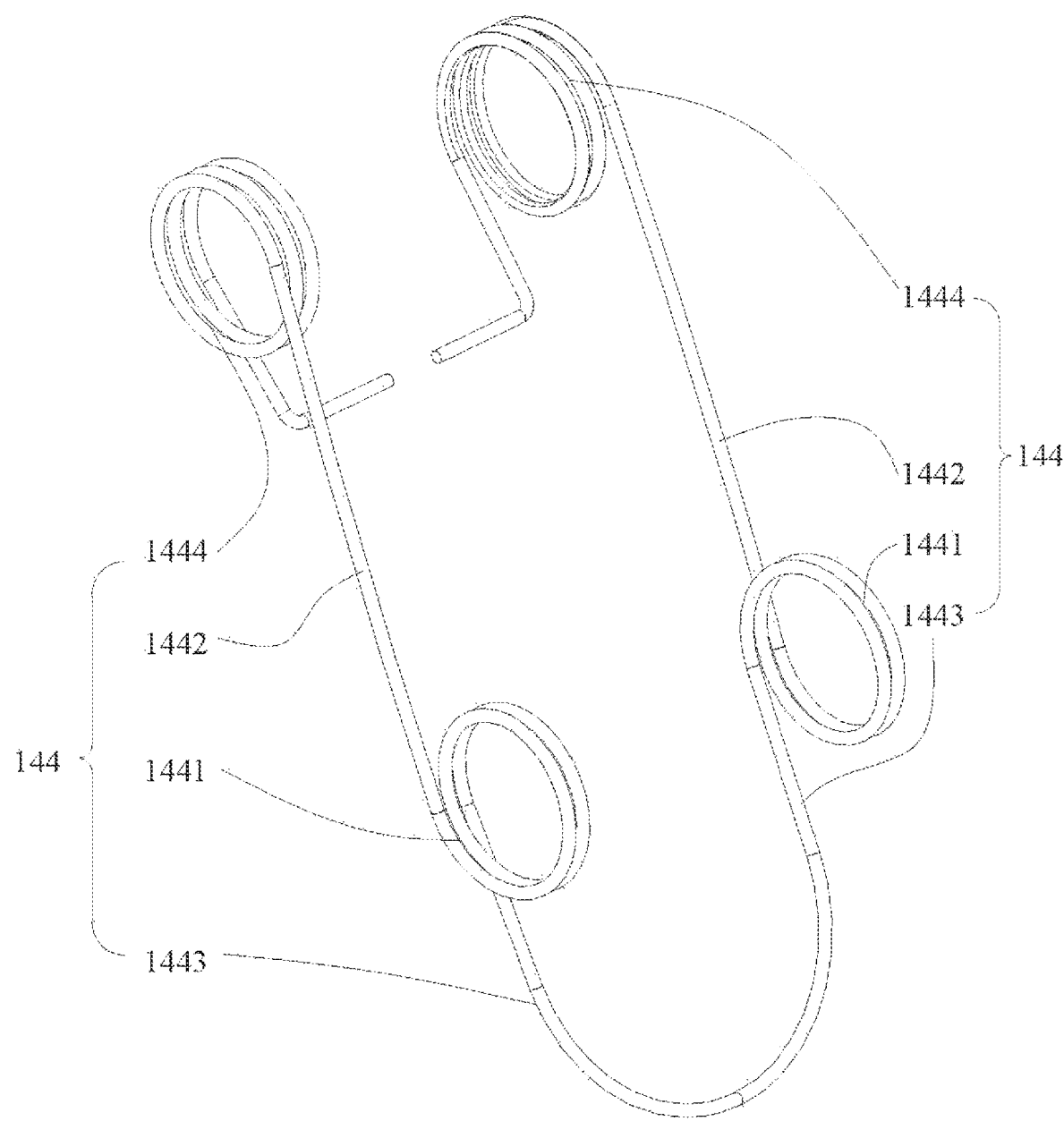
FIG. 6 is an isometric view of another torsion spring of the assembly of FIG. 3.

Referring to FIG. 6, in the embodiment, the second torsion spring 144 includes a helical coiled portion 1441 arranged around the second pin 147, and a helical coiled portion 1444 arranged around the first bar 1422 and connected to the coiled portion 1441.

Referring to FIGS. 3 and 4, the second torsion spring 144 further includes a first arm 1442 extending from one end of the coiled portion 1441, and a second arm 1443 extending from the opposite end of the coiled portion 1441 and connected to the arm 120.

In an alternative embodiment, the second torsion spring 144 may include two coiled portions 1441 and two coiled portions 1444. The two coiled portions 1441 are arranged around the second pin 147 at opposite ends thereof. The two coiled portions 1444 are arranged around the first bar 1422 and respectively connected to the coiled portions 1441 via two first arms 1442. Two second arms 1443 respectively extend from the ends of the coiled portions 1441 that are away from the coiled portions 1444, and are connected to each other to form a U shape. The coiled portions 1444 are located at opposite sides of one end of the first connection member 141, which facilitates the balancing of forces the second torsion spring 144 applied to the first connection member 141 and the arm 120. In the embodiment, the free ends of the coiled portions 1444 are inserted into the first connection member 141 and the U-shaped portion mentioned above is held in position between two components of the arm 120 (see FIG. 2).

Referring to FIGS. 1-4, in one embodiment, the armor decorative member 130 includes a base 131 and a cover 132 that is detachably connected to the base 131. The base 131 is connected to the first connection member 141 via the connection shaft 145, and defines an opening 1301. During assembling, the connection member 141 is first connected to the base 131 and the base 131 is then connected to the cover 132. Since the base 131 is provided with the opening 1301, the connection assembly 140 can be observed during assembling, which make it easy to assembly these components, thereby improving assembling efficiency. In the embodiment, the base 131 and the cover 132 are connected to each other via screws.

Figure 7:
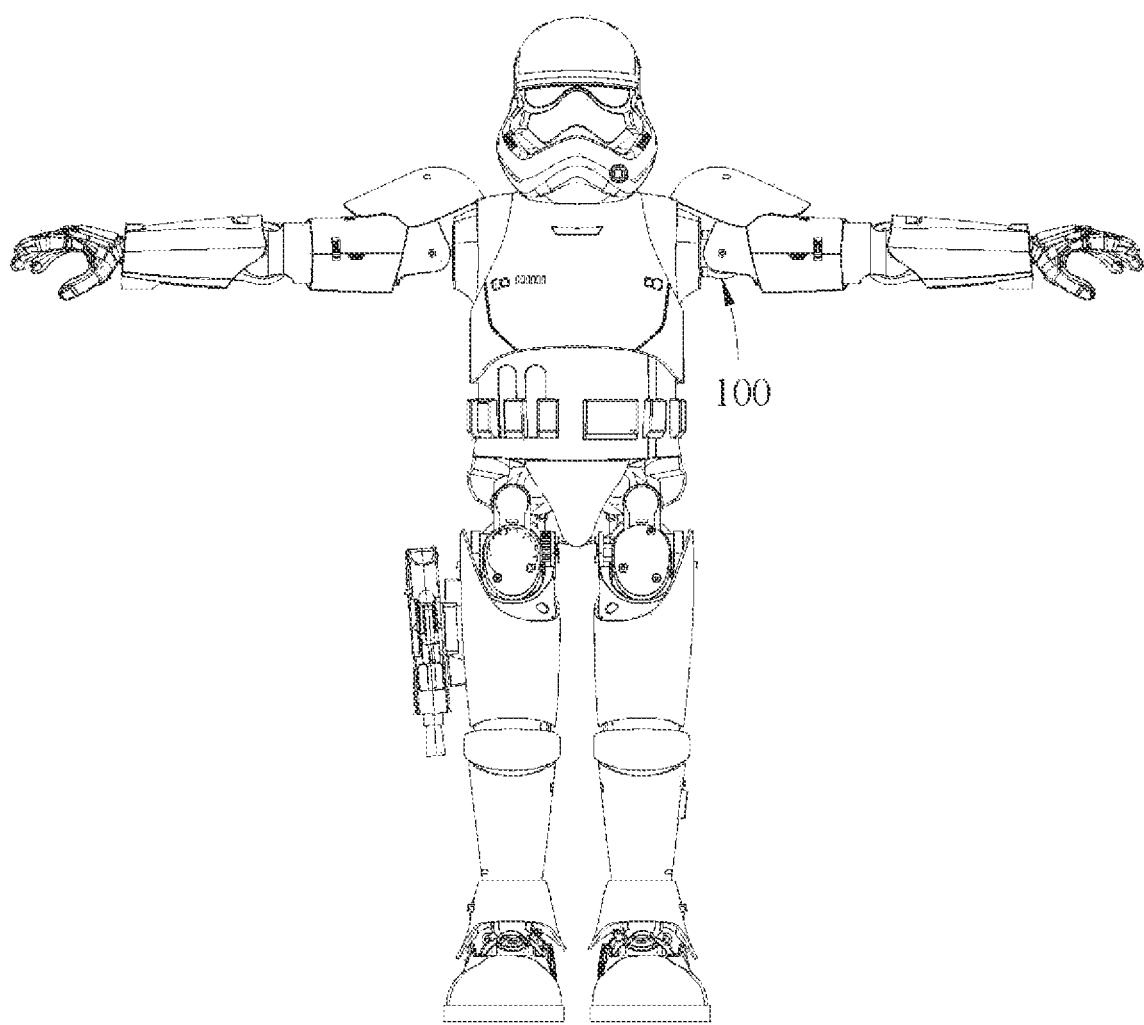
FIG. 7 is an isometric view of a humanoid robot having the assembly of FIG. 1.

Referring to FIG. 7, in one embodiment, a robot that is shaped to resemble a Star Wars Stormtroopers includes the assembly 100 as described above.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An assembly for a robot, comprising:
    a shoulder;
    an arm rotatably connected to the shoulder;
    an armor decorative member connected to the arm and located adjacent to the shoulder;
    a connection assembly located between and rotatably connected to the arm and the armor decorative member, wherein relative rotation between the arm and the connection assembly and between the armor decorative member and the connection assembly enables the arm to continue to rotate after an upper end of the armor decorative member comes into contact with the shoulder; and
    a connection shaft;
    wherein the connection assembly comprises a first connection member, a second connection member, a first torsion spring and a second torsion spring, the first connection member comprises a first end rotatably connected to the armor decorative member and a second, opposite end, the second connection member comprises a first bar and a second bar, the second end of the first connection member is rotatably connected to the first bar, the first torsion spring is connected to the first connection member and configured to apply a restoring force to the armor decorative member, and the second torsion spring is connected to the first bar and the second bar and configured to return the first connection member and the second connection member to original orientation thereof with respect to the arm;
    wherein the first end of the first connection member defines a first connection hole, and the armor decorative member defines a mounting hole, one end of the connection shaft is fixed in one of the first connection hole and the mounting hole, and an opposite end of the connection shaft is rotatable in the other one of the first connection hole and the mounting hole, thereby rotatably connecting the armor decorative member to the first connection member.

2. The assembly of claim 1, wherein the second connection member further comprises a first connection support, a second connection support, opposite ends of the first bar are fixed to the first connection support and the second connection support at first ends thereof, and opposite ends of the second bar are fixed to the first connection support and the second connection support at second ends thereof.

3. The assembly of claim 2, wherein the second connection member further comprises a first pin and a second pin, the first bar and the second bar are hollow, the first pin passes through, in sequence, the first end of the first connection support, the first bar and the first end of the second connection support so as to fix the first bar to the first connection support and the second connection support, and the second pin passes through, in sequence, the second end of the first connection support, the second bar and the second end of the second connection support so as to fix the second bar to the first connection support and the second connection support.

4. The assembly of claim 1, wherein the first torsion spring comprises a coiled portion arranged around the connection shaft, a first arm extending from one end of the coiled portion and staying in contact with the armor decorative member, and a second arm extending from an opposite end of the coiled portion and connected to the first connection member.

5. The assembly of claim 1, wherein the second torsion spring comprises a first coiled portion arranged around the second bar, and a second coiled portion arranged around the first bar and connected to the first coiled portion, and the second coiled portion is fixed tot the arm.

6. The assembly of claim 1, wherein the second torsion spring comprises two first coiled portions arranged around the second bar and two second coiled portions arranged around the first bar and respectively connected to the two first coiled portions, a first arm extends from an end of each of the first coiled portions that is away from the second coiled portions, the two first arms are connected to each other to form a U shape.

7. The assembly of claim 6, wherein the two second coiled portions are located at opposite sides of the second end of the first connection member.

* * * * *